United States Patent [19]

Geesen

[11] 4,224,036

[45] Sep. 23, 1980

[54] METHOD OF CONCENTRATING SALT SOLUTIONS

[75] Inventor: Donald H. Geesen, Wilcox, Canada

[73] Assignee: PPG Industries Canada Ltd., Regina, Canada

[21] Appl. No.: 892,453

[22] Filed: Apr. 3, 1978

[51] Int. Cl.$^2$ .................. B01D 9/02; B01D 1/26
[52] U.S. Cl. .................. 23/296; 23/302 R; 159/47 R
[58] Field of Search ........... 23/296, 303, 302 T, 23/302 R, 298; 159/47 R, 17 R, DIG. 8

[56] References Cited

U.S. PATENT DOCUMENTS

| | | | |
|---|---|---|---|
| 1,216,187 | 2/1917 | Trump | 23/296 |
| 3,365,278 | 1/1968 | Kelly et al. | 23/296 |
| 3,433,603 | 3/1969 | Jeffery | 23/300 |
| 3,704,101 | 11/1972 | Kelly | 23/296 |
| 4,158,043 | 6/1979 | Gloster | 23/302 T |

Primary Examiner—Hiram H. Bernstein
Attorney, Agent, or Firm—Walter M. Benjamin

[57] ABSTRACT

Disclosed is an improved method of concentrating an aqueous solution containing a first salt and a second salt, the solubility of the first salt increasing more greatly with increasing temperatures than the solubility of the second salt, by multiple effect evaporation, wherein the first evaporator effect is the hottest, mother liquor effluent overflow from cooler evaporator effects is forwarded to hotter evaporator effects, mother liquid effluent overflow from the first evaporator effect is forwarded to a zone maintained at atmospheric pressure and mother liquor effluent from the zone maintained at atmospheric pressure is forwarded to a first salt recovery step. In the improved method, the first evaporator effect is operated at super atmospheric pressure and at least 4° C. above the atmospheric boiling point temperature of the mother liquor therein and flashing of mother liquor effluent overflow therefrom is reduced by mixing therewith sufficient mother liquor effluent overflow from a cooler evaporator effect to provide a resultant solution which is reduced more than 2° C. in temperature, preferably to its atmospheric boiling point temperature, and is substantially at its invariant composition at that temperature.

20 Claims, 3 Drawing Figures

Fig.3

METHOD OF CONCENTRATING SALT SOLUTIONS

BACKGROUND OF THE INVENTION

This invention relates to an improved method of concentrating by multiple effect evaporation solutions containing mixtures of salts and particularly this invention relates to concentrating by multiple effect evaporation solutions containing a first and a second salt where the solubility of the first salt increases more greatly with increasing temperatures than the solubility of the second salt. Even more particularly, this invention relates to an improved method whereby the solution concentrated contains principally potassium chloride and sodium chloride with minor amounts of other salts such as magnesium chloride, calcium sulfate, calcium carbonate, magnesium sulfate, and calcium chloride.

Salts having a solubility that increase with increasing temperatures within a given temperature range, hereinafter called first salts, and salts having a solubility that remains relatively unchanged or decreases with increasing temperatures within the same temperature range, hereinafter called second salts, are frequently found as mixtures in naturally occurring ores. In recovering such salts, the ore is dissolved in a suitable aqueous solvent forming a solution from which the salts can be easily separated. Admixtures of these salts in solution can also arise as a result of commercial chemical production, e.g., electrolysis of electrolytes. Conventionally, salts are separated from the solution by concentrating the solution by evaporation to produce a solution in which the first and second salt are concentrated to their "invariant composition". By "invariant composition" is meant a composition in which a solution at a given temperature is saturated with respect to two or more salts. This solution is forwarded to a recovery zone where the first salt is recovered, e.g., by cooling the solution so that the first salt will crystallize out of solution and precipitate. The temperature range at which the water removal step and cooling step take place is a range in which the first salt and second salt maintain their solubility characteristics. If the second salt is initially in high enough concentration, it will be precipitated and can be recovered during the initial evaporation step. Otherwise, subsequent evaporation after first salt is recovered can yield production of the second salt. Thus, alternate evaporation and cooling can substantially deplete the solution of the first and second salt.

Potassium chloride (first salt) and sodium chloride (second salt) are recovered commercially from naturally occurring ores comprising principally potassium chloride and sodium chloride and minor amounts of magnesium chloride, calcium chloride, magnesium sulfate, calcium sulfate, and calcium carbonate, i.e., less than 2 percent of other salts and impurities. In this commercially practiced process, water is removed from the solution by evaporation until the solution approaches or reaches its invariant composition. Large amounts of sodium chloride and some salt impurities are precipitated and sodium chloride removed during the evaporation step. The solution is then purged of impurities precipitated during evaporation and cooled to crystallize potassium chloride while other salts and impurities remain in solution.

The invariant composition of potassium chloride-sodium chloride solutions is affected by other salts in the solution. For example, solutions of many naturally occurring potassium chloride-sodium chloride containing ores also contain chloride, carbonates, and sulfates of anions other than sodium and potassium as hereinbefore mentioned. The presence of some of these other salts will lower the salt concentration of the invariant composition from the concentration found for a mixture of only sodium chloride and potassium chloride. For example, the presence of a few parts magnesium chloride per hundred parts water will lower the invariant composition by a few parts each of sodium chloride and potassium chloride per hundred parts of water.

Evaporation of potassium chloride-sodium chloride solutions are carried out with great efficiency by utilizing evaporators in a multiple effect manner to achieve high product recovery and great steam economy. These multiple effect evaporators operate at relatively higher temperatures in the direction of the flow of the solution. That is, mother liquor effluent overflow from cooler evaporator effects is forwarded to hotter evaporator effects. To obtain a satisfactory working temperature difference between the first evaporator effect and the last evaporator effect, the first evaporator effect is operated under super atmospheric pressure and the last evaporator effect is operated under vacuum. As the solution passes through each evaporator effect, water is removed in the form of vapor and the solution becomes concentrated with respect to the salts; thus, sodium chloride will begin to precipitate (because of its solubility characteristic) and settle to the bottom of the evaporator effect where it is recovered, e.g., through an elutriation leg in communication with the bottom of each evaporator. Sodium chloride will precipitate until the solution reaches its invariant composition for the temperature at which each evaporator effect is operated. Impurities having second salt solubility characteristics such as calcium sulfate, calcium carbonate, and magnesium sulfate may be precipitated as well during the process but are fluidized to avoid their settling.

These evaporator effects are commonly heated by steam in a direction opposite to the direction of the flow of the solution to be concentrated. The first evaporator effect is heated by introducing steam from an external source, such as a boiler, and the second evaporator effect is heated with the vapors from the first evaporator effect and so on, progressively to the last evaporator effect.

Mother liquor effluent overflow from the first evaporator effect is transferred to a potassium chloride recovery zone. This mother liquor effluent overflow is usually slightly below the invariant composition, that is, less than 100 percent saturated with respect to potassium chloride (above 85 and up to about 98 percent saturated with respect to potassium chloride) so that potassium chloride is not crystallized out and lost before reaching the potassium chloride recovery zone. The recovery zone can be a series of crystallizers in which the mother liquor effluent overflow from the first evaporator effect is cooled to precipitate potassium chloride. Due to the hereinbefore described solubility characteristic of sodium chloride (a second salt), sodium chloride will not precipitate thereby allowing potassium chloride to precipitate esentially pure.

Before being introduced to the first salt recovery zone, the first evaporator effect mother liquor effluent overflow is commonly forwarded to a solids settling zone or thicknener. In the solids settling zone, fine particles comprising mostly precipitated fluidized salt impurities, as hereinbefore described, are allowed to settle. Typically, the settling zone is operated at atmospheric conditions and must be maintained under quiescent conditions in order for the settling to take place. Once the finely divided particles have settled out of the mother liquor, the mother liquor can be forwarded to the potassium chloride recovery zone. It is therefore imperative that the first evaporator effect mother liquor overflow leaving the first evaporator effect at super atmospheric pressure and above its atmospheric boiling point temperature does not experience flashing in the settling zone. Flashing will result in agitation of the mother liquor in the settling zone, thereby making it difficult for the settling of the fine particles to occur. Also, flashing cools the mother liquor causing potassium chloride to be precipitated and consequently lost with the settling solids which are purged from the process.

The mother liquor effluent can be flashed into a special flash evaporator from which the vapor is recycled to the multiple effect evaporation zone and the equilibrium liquid forwarded to the settling zone under quiescent conditions. This method is undesirable because fine particles of potassium chloride crystals are precipitated in the flash evaporator along with sodium chloride thus requiring recycle of the solids back to preceding evaporators for the potassium chloride to be redissolved. Moreover, this method is undesirable because the energy level or temperature of the flashed vapor is often not sufficiently high to be used above the third evaporator effect thereby losing one effect of evaporator economy based on a thermal energy balance.

BRIEF SUMMARY OF THE INVENTION

The present invention comprises operating the first evaporator effect at super atmospheric pressure and at least 4° C. above the atmospheric boiling point temperature of the solution therein and mixing with the first evaporator effect mother liquor effluent overflow a sufficient amount of cooler mother liquor effluent overflow from a cooler evaporator effect to provide a resultant solution that is at least 2° C. below the first evaporator effect mother liquor effluent overflow temperature and substantially at the invariant composition at the reduced temperature, thereby reducing or avoiding altogether the flashing thereof when the resultant solution is forwarded to a zone maintained at atmospheric pressure. Thus, evaporator economy losses can be reduced or avoided, thereby saving energy costs. Flashing can be eliminated altogether by reducing the temperature of the mother liquor effluent overflow from the first evaporator effect essentially to its atmospheric boiling point temperature so that when the resultant solution is forwarded to the zone maintained at atmospheric pressure, flashing of the solution is avoided completely, thus eliminating the capital cost requirement for a flash evaporator system and avoiding all the shortcomings associated therewith.

BRIEF DESCRIPTION OF THE DRAWINGS

The invention will become more clear and other objects and advantages will become apparent from the detailed description of the invention which is made with reference to the drawings, in which.

DETAILED DESCRIPTION OF THE INVENTION

According to the present invention, a method is disclosed whereby the first evaporator effect is operated at super atmospheric pressure and at a temperature at least 4° C. above the atmospheric boiling point temperature of the solution therein when concentrating a solution containing a mixture of first and second salts. To facilitate such an operation, a sufficient amount of the mother liquor effluent overflow from a cooler evaporator effect is mixed with the mother liquor effluent overflow from the first evaporator effect to reduce the temperature thereof at least 2° C., thereby reducing flashing when the resultant mixing mixture is subjected to atmospheric pressure.

First salts treated by the method of the present invention are salts having a solubility increasing with increasing temperatures within a given temperature range. Accordingly, first salts include salts such as potassium chloride, magnesium chloride, sodium carbonate, and sodium chlorate. The second salts are salts which do not form a compound with the first salt and which have a solubility increasing less with increasing temperatures (1) within the temperature range at which the evaporation is to be carried out, and (2) within the temperature range at which the solubility of the first salt increases with increasing temperatures. By having a solubility increasing less with increasing temperature, an increase in solution temperature will increase the solubility of the second salt much less than the increase in temperature will increase the solubility of the first salt. Hence, second salts contemplated within the scope of this invention include salts that have a solubility which decreases with increasing solution temperature. Accordingly, second salts include sodium chloride, calcium sulfate, and magnesium sulfate. The method of the present invention will be described with respect to potassium chloride and sodium chloride as the first and second salts.

As hereinbefore described, the first evaporator effect can be operated above atmospheric pressure and above the atmospheric boiling point temperature of the solution. The degree to which the first evaporator effect can be operated above atmospheric pressure and above the atmospheric boiling point temperature of the solution therein requires consideration of several factors. These factors are, among others, the amount of mother liquor effluent overflow (hereinafter called overflow) available from cooler evaporator effects to substantially lower the temperature thereof, too much precipitation of potassium chloride and sodium chloride if some flashing of overflow from the first evaporator effect is allowed to occur, the temperature at which potassium chloride and sodium chloride lose the relative solubility characteristics (with respect to being first and second salts), the capability of the evaporation equipment to withstand high temperatures and pressures and the allowable evaporator economy losses if some flashing is allowed.

The overflow of cooler evaporators can effectively lower the temperature of overflow from the first evaporator effect to the atmospheric boiling point temperature thereof if the temperature of the cooler evaporator effect is sufficiently low. In some cases, the temperature of the second evaporator effect may also be above the atmospheric boiling point temperature of the overflow from the first evaporator effect when the first evaporator effect is operated at very high temperatures. For example, if the first evaporator effect operating temperature is 138° C., the second evaporator effect may be operated at about 115° C., which is above the atmospheric boiling point temperature of the first evaporator effect overflow comprising a potassium chloride-sodium chloride solution. Thus, in such a case, the overflow from the second evaporator effect would be too high to lower the temperature of the overflow from the first evaporator effect to the atmospheric boiling point temperature of the resultant solution mixture. Hence, in such a case, overflow from the third evaporator effect or cooler evaporator effect should be used. However, use of overflow from an evaporator effect more than one-effect higher than the first evaporator effect reduces energy efficiency owing to the loss of multiple effect heating of the cooler overflow solutions. Hence, the hottest evaporator effect having an operating temperature below the atmospheric boiling point temperature of the overflow from the first effect evaporator is preferred for mixing.

The amount of overflow from the cooler evaporator effect necessary for a given temperature reduction of the overflow from the first evaporator effect is related to the temperature difference between the mixing solutions and the quotient of the amount of overflow from the first evaporator effect and the amount of overflow from the cooler evaporator effect. For example, a solution containing sodium chloride and potassium chloride at its invariant composition at 121° C. and above atmospheric pressure has an atmospheric boiling point temperature of about 112° C. Therefore, three liters of the solution at 121° C. will be reduced about 9° C. with approximately one liter of a mixing solution having a temperature of 93° C., assuming no heat transfer from the conduits to the solutions. Care should be taken so that an excess of overflow from the cooler evaporator effect is not mixed with the overflow from the first evaporator effect so that the temperature thereof is reduced below its atmospheric boiling point temperature. As a result, the potassium chloride concentration of the resultant solution would be lower thereby yielding less potassium chloride in the potassium chloride recovery zone. Therefore, it is preferred that the resultant mixture be no lower than 5° C. below its atmospheric boiling point temperature and more preferably no lower than 2° C. below its atmospheric boiling point temperature.

The temperature of the overflow from the first evaporator effect can be partially reduced to some point above its atmospheric boiling point temperature by the practice of the present invention, in which case the further lowering of the temperature to the solution's atmospheric boiling point temperature is accomplished by flashing. The flashing should occur in a flash evaporator to avoid flashing when the solution is forwarded to a settling zone, thereby avoiding agitating the mother liquor solution therein. Since the flash evaporator reduces the temperature by immediately reducing the solution under super atmospheric pressure to atmospheric pressure, and releasing vapor therefrom, evaporator economy is lost owing to the limited use thereof as a heat source in the multiple effect evaporator system. The flashed vapor can be used to heat the solution in an evaporator effect which operates at a temperature sufficiently lower than the temperature of the flashed vapor. Flashed vapor from the overflow from the first evaporator effect is limited to heating the third evaporator effect or higher evaporator effects. Thus, at least one effect of evaporator economy is lost through the flashing and use of the flashed vapor. As a result, it is preferred that the temperature of the overflow from the first evaporator effect is reduced at least 2° C. and preferably that the temperature of the overflow from the first evaporator effect is reduced to its atmospheric boiling point temperature. This is true when the first effect evaporator is operated at super atmospheric pressure and at least 4° C. above the atmospheric boiling point temperature i.e., when the hereinbefore and hereinafter described problems of flashing become substantial.

During the flashing of the overflow from the first effect evaporator, fine particles of potassium chloride and sodium chloride will be precipitated. The amount of these particles precipitated should be kept to a minimum because those particles must either be separated from the solution and recycled back to the evaporators or forwarded to the settling zone wherein they will be lost with other fine particles purged from the system. Hence, flashing should be kept to a minimum for purposes of minimizing the amount of potassium chloride and sodium chloride precipitated.

However, any substantial reduction in the temperature of the overflow from the first evaporator effect results in significant savings owing to improved evaporator economy, notwithstanding the shortcomings of further reducing the temperature of the overflow of its atmospheric boiling point by flashing. The amount of reduction in thermal energy loss is related to the reduction in flashing, but is also dependent upon the plant size, the type of equipment used, and energy prices. For example, for a one million ton per year potassium chloride plant the savings is substantial for a few degrees, e.g., 2° C., of temperature reduction of the overflow from the first evaporator effect, i.e., the cost savings would be the cost of over 8.4 million joules per minute per degree Centigrade. Thus, cost savings is realistic for plants having a much smaller capacity. Hence, in cases where very little cooler overflow solution is available for mixing, it is nonetheless beneficial to utilize this cooler overflow solution in accordance with the practice of this invention.

The overflow from the cooler evaporator effect that is utilized for mixing and the overflow from the first effect evaporator should be substantially at their invariant composition so that the resultant solution mixture at the reduced temperature is at or near its invariant composition. Since the temperature of the overflow from the first evaporator effect is reduced by approximately the same amount the mixing overflow from the cooler evaporator effect is raised per unit volume, the invariant composition of the overflows from the first and cooler evaporator effects will be raised and lowered, respectively, nearly in accordance with the raising and lowering of the temperatures. Consequently, the resultant solution will be substantially at its invariant composition. By the same token, if either of the aforesaid overflows is below its invariant composition, the resultant mixture will also be below its invariant composition. This is true because of the linearity of the invariant composition curve of potassium chloride and sodium chloride solutions at various temperatures. By being substantially at its invariant composition the resultant mixture is between about 85 and 98 percent saturation with respect to potassium chloride and sodium chloride therein.

The amount of cooler overflow mixed with the overflow from the first evaporator effect and hence the amount of temperature reduction experienced by the overflow from the first evaporator effect corresponds to the extent of flashing reduced when the mixture is forwarded to the zone maintained at substantially atmospheric pressure. Accordingly, when the temperature of the overflow from the first evaporator effect is reduced essentially to the atmospheric boiling point temperature of the resultant mixture, flashing of the resultant solution is totally avoided when the solution is forwarded to the zone maintained substantially at atmospheric pressure such as a settling zone.

The overflow from the cooler evaporator effect is mixed directly with the overflow from the first evaporator effect such as by merging conduits carrying overflow solutions from each evaporator effect. The amount of overflow from the cooler evaporator effect is metered to control the resultant solution temperature with the remainder of the overflow being fed to the next hotter evaporator effect. Flow or line mixers such as jet mixers, injectors, orifice and mixing nozzles, valves, pumps, agitated line mixers, and the like may be utilized. Adequate interdispersion of the overflows while maintaining pressure drop across the mixer is preferred, however.

Figure 1:
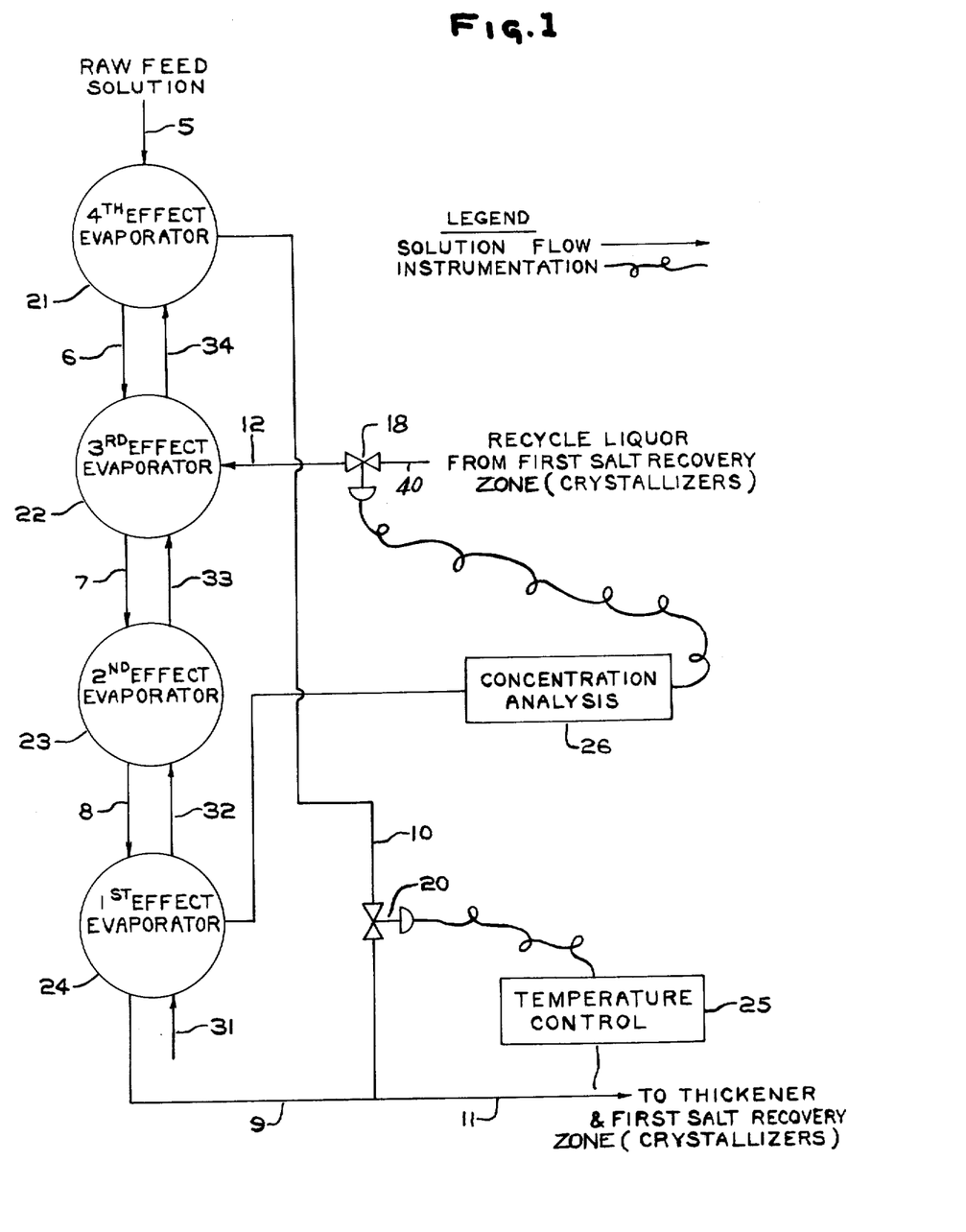
FIG. 1 is a schematic diagram of four evaporator effects in series wherein the first evaporator effect is operated at super atmospheric pressure and is the hottest evaporator effect, and the mother liquor effluent overflow from the cooler evaporators is forwarded to the hotter evaporators and wherein a portion of the mother liquor effluent overflow from the fourth evaporator effect is mixed with the mother liquor effluent overflow from the first evaporator effect.

Reference is now made to FIG. 1 which shows a schematic diagram for multiple effect evaporators operated at progressively higher temperatures. A solution containing potassium chloride and sodium chloride is fed through conduit 5 to the fourth evaporator effect 21. The overflow from the fourth evaporator effect 21 is fed into the third evaporator effect 22 via conduit 6. The overflow from the third evaporator effect 22 is fed into the second evaporator effect 23, via conduit 7. The overflow from the second evaporator effect 23 is fed to the first evaporator effect 24 via conduit 8. The overflow from the first evaporator effect 24, is fed via conduit 9 to a recovery zone where potassium chloride is separated from the solution.

Evaporation in the first evaporator effect 24 at super atmospheric pressure and at a temperature above the atmospheric boiling point of the solution therein is accomplished by introducing steam through conduit 31 from an external source. Evaporation in the second evaporator effect 23, is accomplished by introduction of the vapor from the first evaporator effect 24 via conduit 32. Evaporation in the third evaporator effect 22 and fourth evaporator effect 21, is accomplished by introducing vapor from the second evaporator effect 23 via conduit 33 and third evaporator effect 22 via conduit 34, respectively.

A concentration monitor 26 is placed in the first evaporator effect 24 to analyze isotopes of potassium chloride so that through instrumentation the flow of the liquor from the potassium chloride recovery zone via conduit 40 may be controlled via valve 18. Thus, concentration of potassium chloride in the overflow conduit 9 of the first evaporator effect 24 can be maintained near as possible to saturation, i.e., between 85 and 98 percent saturation. When the potassium chloride concentration in the first evaporator effect 24 becomes low, the amount of recycle via conduit 12 is reduced, thereby reducing the overflow in conduit 7, which in turn allows the potassium chloride concentration in the first evaporator effect to increase. Thus, the solution in the first evaporator effect 24 becomes more saturated with respect to potassium chloride because the same amount, or nearly the same amount, of water is taken off while a lesser amount of solution is being fed thereto. A solution near saturation (between 85 and 100 percent saturation) with respect to potassium chloride, is preferred as the overflow from the first evaporator effect 24. The overflow from the fourth evaporator effect 21 is likewise preferred to be near saturation with respect to potassium chloride. As a consequence, with both overflows from the first and fourth evaporator effects via conduits 9 and 10 being at or near saturation with respect to potassium chloride, a resultant mixture in conduit 11 is at or near saturation with respect to potassium chloride.

A temperature control monitor 25 is placed in conduit 11 so that through instrumentation the amount of mixing via conduit 10 can be controlled via valve 20. The temperature of the solution in conduit 11 can be maintained at its atmospheric boiling point temperature, in spite of varying concentrations and temperatures of the mixing solutions.

FIG. 1 illustrates how first evaporator effect 24 may be operated at super atmospheric pressure and above the atmospheric boiling point temperature of the solution therein without using a flash evaporator. This embodiment is accomplished by mixing overflow from the fourth evaporator effect 21 via conduit 10 with overflow from the first evaporator effect 24 via conduit 9 to form the solution in conduit 11. The mixture is such that the resultant temperature of the solution is its atmospheric boiling point temperature. This embodiment of the invention, however, is not as energy efficient as mixing overflow from an evaporator effect hotter than the fourth evaporator effect, such as the third or second evaporator effect 22 and 23 respectively with overflow from the first evaporator effect. Overflow from the second or third evaporator effect has a greater benefit of multiple effect heating. Hence, if the temperature of the overflow from the second evaporator effect is lower than the atmospheric boiling point temperature of the resultant mixture of such overflow with overflow from the first evaporator effect, then overflow from the second evaporator effect would be preferred for mixing.

Figure 2:
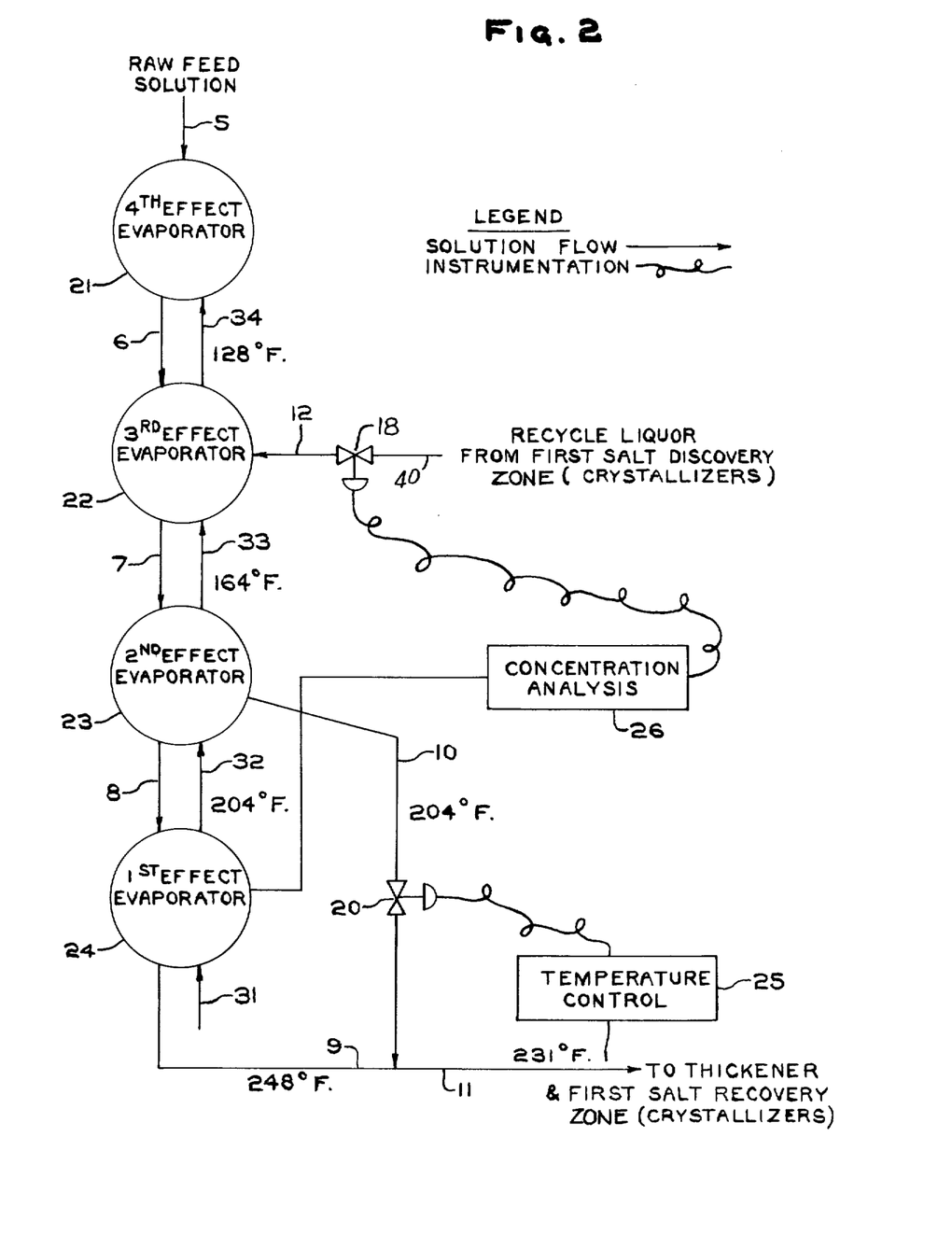
FIG. 2 is a schematic diagram of four evaporator effects in series, as in FIG. 1, except a portion of the mother liquor effluent overflow from the second evaporator effect is mixed with the mother liquor effluent overflow from the first evaporator effect. The temperature profile of the evaporator effects is also shown.

Reference is now made to FIG. 2, wherein like numbers indicate like parts as FIG. 1, which shows four evaporator effects in series and the mixing of overflow from second evaporator effect 23 with overflow from first evaporator effect 24 via conduit 10. Also, a typical temperature profile for the 4-evaporator effect train of the various streams for a potassium chloride-sodium chloride solution system is shown. The temperature of the solutions in conduits 6, 7, and 8 are 53° C.(128° F.), 73° C.(164° F.), and 96° C.(204° F.), respectively. Thus, the fourth evaporator effect 21, third evaporator effect 22, and second evaporator effect 23, are operated under vacuum, owing to the low evaporating temperatures employed. Since the temperature of the solution in conduit 9 is 120° C.(248° F.), the first evaporator effect 24, is operated at super atmospheric conditions.

In the embodiment of FIG. 2, the atmospheric boiling point temperature of the mixed solutions of conduit 9 and 10 would be about 110° C. at the invariant composition. The solution in conduit 10 at its invariant composition at 96° C. and the solution in conduit 9 at its invariant composition at 120° C., is mixed and forms the solution in conduit 11 at its invariant composition at 110° C. A temperature control monitor 25, through instrumentation (not shown) controls the flow of the solution in conduit 10 so that the solution in conduit 11 is maintained at the desired atmospheric boiling point temperature, in spite of variations in concentrations and temperatures of the second and first evaporator effects 23 and 24, respectively.

Figure 3:
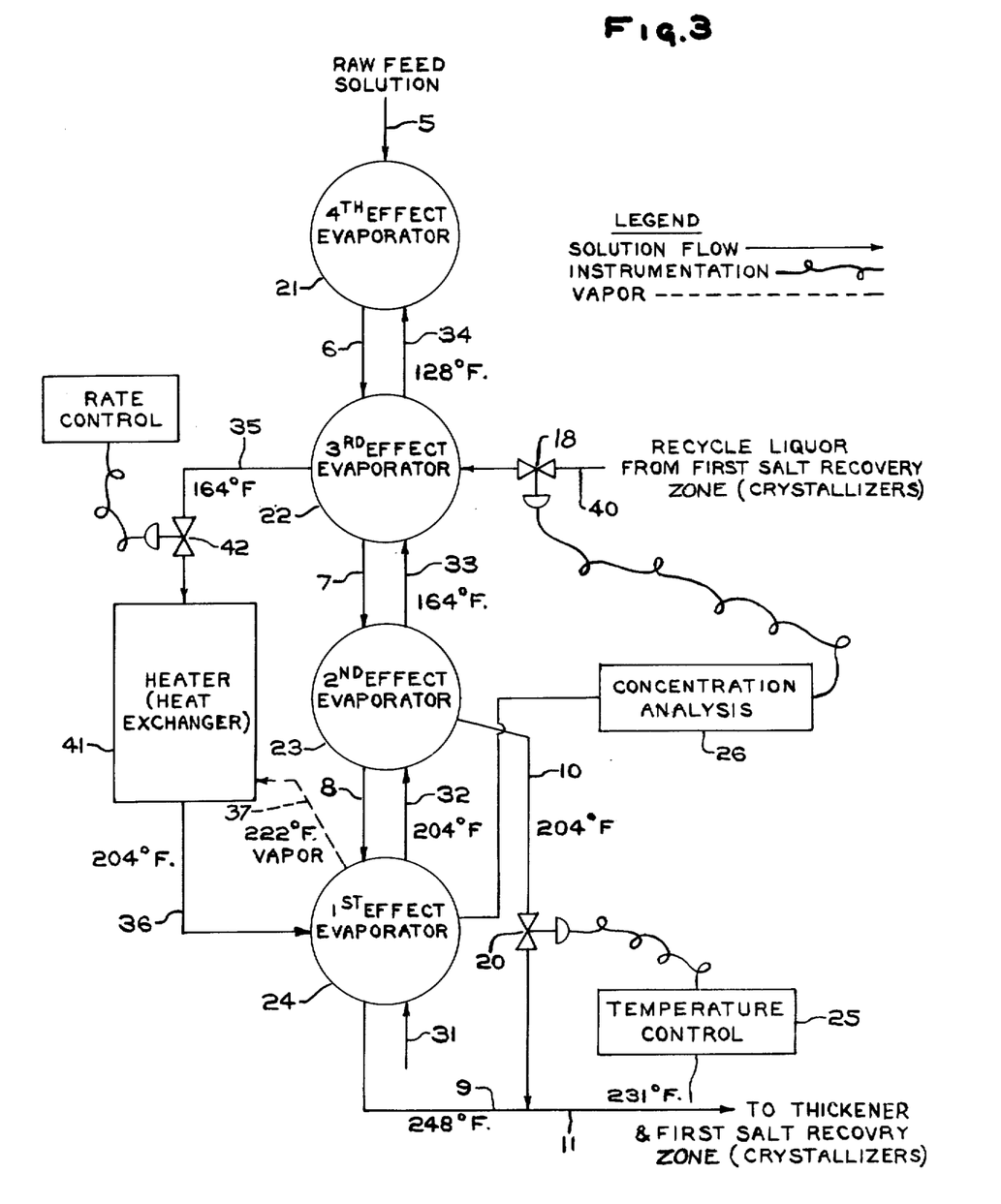
FIG. 3 is a diagram of four evaporator effects in series, as in FIG. 2, except a by-pass around the second evaporator is also shown.

Reference is now made to FIG. 3, wherein like numbers indicate like parts as FIG. 2. Solution withdrawn from third evaporator effect 22 via conduit 35 is fed to the first evaporator effect 24 via heat exchanger 41. The rate of flow through conduit 35 is controlled by valve 42 to maintain the solution in the second evaporator effect 23 and stream 10 between 85 and 98 percent saturation with respect to potassium chloride. In this embodiment of the present invention, another method of increasing the potassium chloride concentration of the solution in conduit 8 is illustrated. If the desired concentration in the first evaporator effect 24 cannot be controlled via valve 18, i.e., by controlling the amount of liquor recycled from the potassium chloride recovery zone, part of the overflow from the third evaporator effect is fed directly to the first evaporator effect 24 via heat exchanger 41. Heat exchanger 41 heats the solution withdrawn from the third evaporator effect via conduit 35 from 73° C. to 96° C. to equal the temperature of the overflow from the second evaporator effect. Consequently, for the reasons stated with respect to the embodiment of FIG. 1, the concentration of the solution with respect to potassium chloride in the second evaporator effect is increased. Heat is provided in the heat exchanger 41 via conduit 37 which receives vapor from the first evaporator effect 24 at 105° C.(222° F.) and condenses the vapor therein, thereby supplying the necessary heat to raise the temperature of the solution fed by conduit 35.

The present invention is more particularly described in the following Example which is illustrative of only one embodiment of the invention. Numerous embodiments will be apparent to those skilled in the art without deviating from the inventive concept. Therefore, this embodiment is intended for illustrative purposes only.

EXAMPLE

Apparatus similar to that illustrated by FIG. 3 is used to separate potassium chloride from a potassium chloride-sodium chloride salt solution. A raw feed solution containing 17 parts potassium chloride per 100 parts water, 30 parts sodium chloride per 100 parts water, and 0.5 part salt impurities per 100 parts water is introduced into the fourth evaporator effect 21 via conduit 5. The feed is concentrated therein with respect to potassium chloride and sodium chloride at 46° C. until the solution is near its invariant composition. The overflow, via conduit 6 is withdrawn from the fourth evaporator effect 21 containing 21 parts potassium chloride per 100 parts water and 29 parts sodium chloride per 100 parts water, and is fed into the third evaporator effect 22 which is also fed with a solution recycled from the potassium chloride recovery zone via conduit 40 containing 18 parts potassium chloride per 100 parts water and 24 parts sodium chloride per 100 parts water.

The solution in the third evaporator effect is evaporated at 73° C. until it is near saturation with respect to potassium chloride. A portion of the overflow from the third evaporator effect is withdrawn via conduit 35 and contains 24 parts potassium chloride per 100 parts water and 26 parts sodium chloride per 100 parts water. This part of the overflow from the third evaporator effect is heated in heat exchanger 41° to 96° C. and fed to the first evaporator effect via conduit 36. The remainder of the overflow from the third evaporator effect 22 is fed into the second evaporator effect 23 via conduit 7.

The solution in the second evaporator effect 23 is evaporated at 96° C. until it is saturated with respect to potassium chloride. Part of the overflow from the second evaporator effect 23 containing 30 parts potassium chloride per 100 parts water and 24 parts sodium chloride per 100 parts water is mixed with the overflow from the first evaporator effect 24 via conduit 10. The remainder of the overflow from the second evaporator effect is fed into the first evaporator effect 24 via conduit 8. The solution in the first evaporator effect is evaporated at super atmospheric pressure and 120° C. until it is near saturation with respect to potassium chloride. The overflow withdrawn from the first evaporator effect via conduit 9 contains 37 parts potassium chloride per 100 parts water and 23 parts sodium chloride per 100 parts water.

The solutions of conduits 9 and 10 are mixed resulting in a solution containing 35 parts potassium chloride per 100 parts water and 23 parts sodium chloride per 100 parts water and is forwarded to a small particle settling zone or thickener via conduit 11 at atmospheric pressure and 110° C. Thus, no flash evaporator is needed to lower the temperature of the overflow from the first evaporator effect 24. Moreover, the resultant solution mixture contains no precipitated potassium chloride fines as a result of cooling.

While this invention has been described with specific reference to potassium chloride-sodium chloride salt solutions, it will be apparent that it will also apply to first salt-second salt solutions generally (e.g., sodium chlorate-sodium chloride solutions) as hereinbefore defined. Various feed concentrations, evaporation temperatures, multiple evaporator effect schemes and kinds of equipment may also be employed without deviating from the present invention. Hence, the specificity of the herein described embodiments should not be regarded as limitations upon the breadth of the invention, except to the extent the limitations are included in the Claims.

What is claimed is:

1. In the concentration of an aqueous solution containing a first salt and a second salt, the solubility of the first salt increasing more with increasing temperatures than the solubility of the second salt, wherein water is removed from the solution by multiple effect evaporation having a plurality of evaporator effects operated at progressively higher temperatures, the first effect of which is the hottest, and wherein mother liquor effluent overflow from a cooler effect is forwarded to A$^2$ a hotter A$^3$ effect and mother liquor effluent overflow from the first effect is forwarded to a zone maintained at substantially atmospheric pressure, the improvement which comprises operating the first evaporator effect at super atmospheric pressure and at least 4° C. above the atmospheric boiling point temperature of the mother liquor therein, the mother liquor being substantially at its invariant composition at the temperature of the first evaporator effect, and mixing directly with the first effect mother liquor effluent overflow sufficient mother liquor effluent overflow from a cooler evaporator effect to provide a resultant aqueous salt solution that is reduced more than 2° C. in temperature and substantially at its invariant composition for that temperature, thereby substantially reducing the flashing thereof when the mixture is forwarded to the zone maintained at substantially atmospheric pressure.

2. The method of claim 1, wherein the reduced temperature is essentially the atmospheric boiling point temperature of the mixture, thereby totally avoiding the flashing thereof when the mixture is forwarded to the zone maintained at substantially atmospheric pressure.

3. The method of claim 1, wherein the first salt is potassium chloride and the second salt is sodium chloride.

4. The method of claim 1, wherein the zone maintained at substantially atmospheric pressure is a settling zone.

5. The method of claim 1, wherein the plurality of evaporator effects is more than three evaporator effects and wherein second effect mother liquor effluent overflow is mixed with the first effect mother liquor effluent overflow.

6. The method of claim 1, wherein the plurality of evaporator effects is more than three evaporator effects and wherein third effect mother liquor effluent overflow is mixed with the first effect mother liquor effluent overflow.

7. In the concentration of an aqueous solution containing principally potassium chloride and sodium chloride salts and a minor amount of salt impurities wherein water is removed from the solution by multiple effect evaporation having a plurality of evaporator effects operated at progressively higher temperatures, the first effect of which is the hottest, and wherein mother liquor effluent overflow from cooler effects is forwarded to a hotter $A^5$ effects and mother liquor effluent overflow from the first effect is forwarded to a settling zone maintained at substantially atmospheric conditions and wherein the settling zone mother liquor is forwarded to a potassium chloride recovery zone, the improvement which comprises operating the first evaporator effect at super atmospheric pressure and at least 4° C. above the atmospheric boiling point temperature of the mother liquor therein, the mother liquor being substantially at its invariant composition at the temperature of the first evaporator effect, and mixing directly with the first effect mother liquor effluent overflow sufficient mother liquor effluent overflow from a cooler evaporator effect to provide a resultant aqueous solution that is reduced at least 4° C. in temperature and is substantially at its invariant composition for that temperature, thereby substantially reducing the flashing thereof when the mixture is forwarded to the settling zone.

8. The method of claim 7, wherein the reduced temperature is essentially the atmospheric boiling point temperature of the mixture, thereby totally avoiding the flashing thereof when the mixture is forwarded to the settling zone.

9. The method of claim 7, wherein the plurality of evaporator effects is more than three evaporator effects and wherein second effect mother liquor effluent overflow is mixed with the first effect mother liquor effluent overflow.

10. The method of claim 7, wherein the plurality of evaporator effects is more than three evaporator effects and wherein third effect mother liquor effluent overflow is mixed with the first effect mother liquor effluent.

11. The method of claim 9, which further comprises recycling an amount of potassium chloride depleted solution from the potassium chloride recovery zone to the third evaporator effect, the amount being varied to maintain the concentration of the first effect mother liquor effluent substantially saturated with respect to potassium chloride.

12. In the concentration of an aqueous solution containing principally potassium chloride and sodium chloride salts and a minor amount of salt impurities wherein water is removed from the solution by multiple effect evaporation having four evaporator effects operated at progressively higher temperatures, the first effect of which is the hottest, wherein mother liquor effluent overflow from cooler effects is forwarded to a hotter effect and wherein mother liquor effluent overflow from the first effect is forwarded to a settling zone maintained at substantially atmospheric conditions and wherein the settling zone mother liquor is forwarded to a potassium chloride recovery zone, the improvement which comprises operating the first evaporator effect at super atmospheric pressure and at least 4° C. above the atmospheric boiling point temperature of the mother liquor therein, the mother liquor being substantially at its invariant composition at the temperature of the first evaporator effect, and mixing directly with the first effect, mother liquor effluent overflow sufficient mother liquor effluent overflow from a cooler evaporator effect to provide a resultant aqueous solution that is essentially at its atmospheric boiling point temperature and substantially at its invariant composition at that temperature, thereby avoiding flashing thereof when the mixture is forwarded to the settling zone.

13. The method of claim 12, wherein second effect mother liquor effluent overflow is mixed with the first effect mother liquor effluent overflow.

14. The method of claim 12, wherein third effect mother liquor effluent overflow is mixed with the first effect mother liquor effluent overflow.

15. The method of claim 14, which further comprises recycling an amount of potassium chloride depleted solution from the potassium chloride recovery zone to the third evaporator effect, the amount being varied to maintain the concentration of the first effect mother liquor effluent overflow substantially at 100 percent saturation with respect to potassium chloride.

16. The method of claim 12, wherein a portion of the third evaporator effect mother liquor effluent overflow bypasses the second evaporator effect and is fed through a heat exchanger to the first evaporator effect, this portion being varied to maintain the concentration of the second evaporator effect mother liquor effluent substantially saturated with respect to potassium chloride.

17. The method of claim 1, claim 7, or claim 12, wherein coldest evaporator effect mother liquor effluent overflow is mixed with the first evaporator effect overflow.

18. The method of claim 1, claim 7, or claim 12, wherein hottest evaporator effect mother liquor effluent overflow having a temperature lower than the atmospheric boiling point temperature of the first evaporator effect mother liquor effluent overflow is mixed with the first evaporator effect mother liquor effluent overflow.

19. The method of claim 1 or claim 7, wherein the mother liquor in the first evaporator effect is maintained at least 15° C. above its atmospheric boiling point temperature and wherein the first evaporator effect mother liquor effluent overflow temperature is reduced at least 10° C.

20. The method of claim 1 or claim 7, wherein the mother liquor in the first evaporator effect is maintained at least 20° C. above its atmospheric boiling point temperature and wherein the first evaporator effect mother liquor effluent overflow temperature is reduced at least 5° C.

* * * * *